United States Patent [19]
Greenstein

[11] Patent Number: 6,015,224
[45] Date of Patent: Jan. 18, 2000

[54] CALCULATOR

[76] Inventor: Bonnie Greenstein, 1310 Ave. R (Apt. #2-M), Brooklyn, N.Y. 11229

[21] Appl. No.: 08/614,665

[22] Filed: Mar. 13, 1996

[51] Int. Cl.[7] ........................................................ G06F 3/00
[52] U.S. Cl. ......................... 364/710.08; 341/27; 434/113
[58] Field of Search ......................... 364/710.08, 710.12, 364/709.01, 709.12; 434/112–116; 341/20–23, 27

[56] References Cited

U.S. PATENT DOCUMENTS

| | | | |
|---|---|---|---|
| 3,932,869 | 1/1976 | Kane | 434/114 |
| 4,024,536 | 5/1977 | Anderson | 434/114 |
| 4,033,053 | 7/1977 | Engler | 434/114 |
| 4,305,067 | 12/1981 | Tretiakoff et al. | 434/114 |
| 4,334,280 | 6/1982 | McDonald | 341/27 |
| 4,445,871 | 5/1984 | Becker | 434/114 |
| 5,154,614 | 10/1992 | Matsuoka et al. | 434/112 |

*Primary Examiner*—Tan V. Mai
*Attorney, Agent, or Firm*—Goldstein & Associates

[57] ABSTRACT

A calculator, comprising a keyboard having keys, each key having tactile symbols which indicate in Braille the numeral or function that the key represents. The calculator communicates its calculated numerical results visually, audibly, and tactiley. The tactile indication provides the result by a series of counting pulses, which represent the numerals in the result, the numerals separated by numerals spaces. The speed that the result is tactiley communicated is controllable by the user.

11 Claims, 2 Drawing Sheets

CALCULATOR

BACKGROUND OF THE INVENTION

The invention relates to a calculator. More particularly, the invention relates to a calculator for use by persons lacking visual or visual and auditory senses, whereby the keyboard may provide visual, tactile and audible feedback, and output is provided visually, audibly, and tactiley.

In the past, it was simply assumed that persons having visual or auditory impairments would not be able to perform the same tasks as a "sighted" or "hearing" person. These people were routinely referred to as "handicapped", because they were considered to be helpless in performing many tasks.

However, great social strides have allowed people with visual and auditory impairments to perform virtually any job performed by sighted and hearing people. Where determination and peer acceptance have failed to provide a solution, technology has picked up the slack by providing devices which provide acceptable alternatives for sight and hearing.

Still, certain common devices that we take for granted are inaccessible to people with hearing and sight impairment. The common calculator is generally not useable by a sightless person, or a person lacking sight and hearing senses. In addition, many devices for the blind "speak" out loud, making them unsuitable for use in a classroom or crowded workplace.

While these units may be suitable for the particular purpose employed, or for general use, they would not be as suitable for the purposes of the present invention as disclosed hereafter.

SUMMARY OF THE INVENTION

It is an object of the invention to produce a calculator suitable for use by the visually impaired, by providing a keyboard encoded with tactile symbols, such as Braille, and by providing an audible output.

It is another object of the invention to produce a calculator suitable for use by persons having both sight and hearing impairments, by providing the keyboard encoded with tactile symbols, and by providing a tactile output.

It is yet another object of the invention to provide an output while not disturbing others, and without reducing a visually impaired person's ability to hear sounds in the surrounding environment.

It is a further object of the invention that the calculator provides standard visual input and output feedback, for use by persons possessing visual senses.

It is a still further object of the invention that the calculator has provisions for use by an inexperienced, as well as an experienced user.

The invention is a calculator, comprising a keyboard having keys, each key having tactile symbols which indicate in Braille the numeral or function that the key represents. The calculator communicates its calculated numerical results visually, audibly, and tactiley. The tactile indication provides the result by a series of counting pulses, which represent the numerals in the result, the numerals separated by numerals spaces. The speed that the result is tactiley communicated is controllable by the user.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
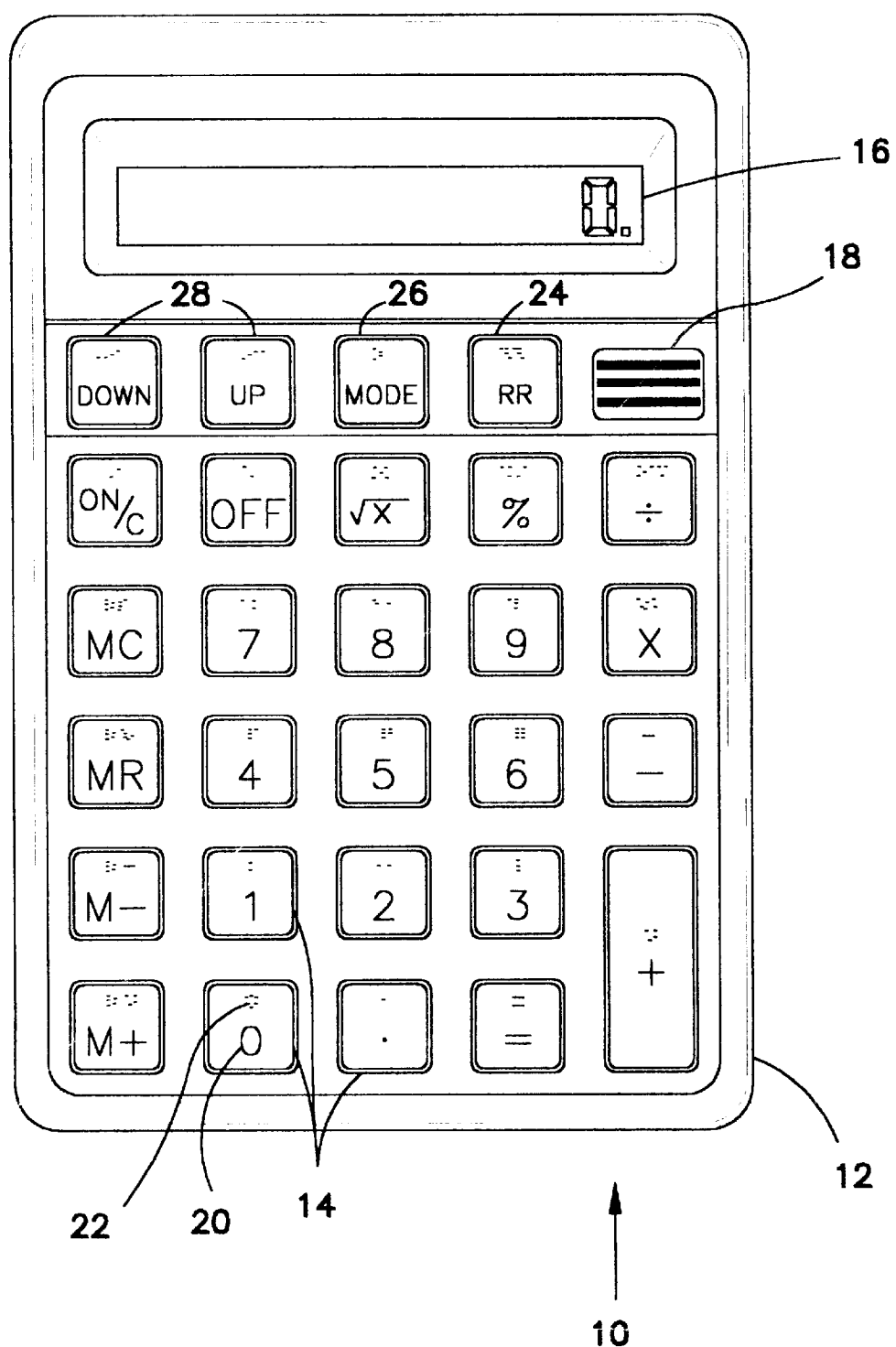
FIG. 1 is a top plan view of a calculator according to the present invention.

FIG. 1 illustrates a calculator 10. The calculator 10 has a housing 12. The calculator 10 has a keyboard comprising keys 14, and a display 16.

Each of the keys 14 has indicia 20 visually indicating the function of the key 14 and a tactile symbol 22, also indicating the function of the key 14. Typically, the indicia 20 is simply an Arabic numeral, and the tactile symbol 22 is the Braille representation for that numeral. Other functions, such as ON, OFF, percent, multiplication, division, addition, and subtraction operations are also represented on different keys 14. In addition, the keyboard may include a repeat result key 24, a mode selection key 26, and speed up and down keys 28.

The display 16 may comprise an alphanumeric LCD display, for visually indicating the results of calculations performed by the calculator 10. The display 16 would typically be capable of displaying ten to twenty digits. A speaker 18 is also present in the housing 12 for producing an audible output.

Figure 2:
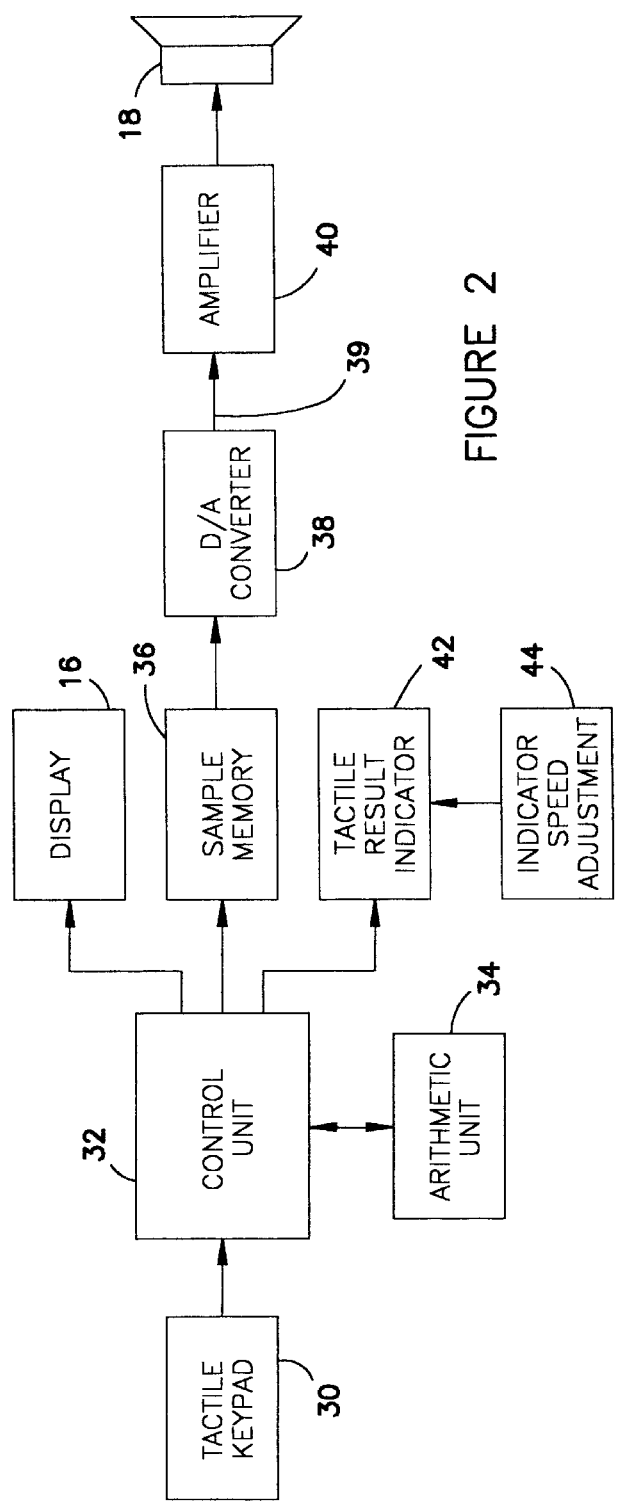
FIG. 2 is a block diagram of an embodiment of the invention.

FIG. 2 is a block diagram illustrating the calculator 12. The calculator comprises a tactile keypad 30, comprising the keys 14, which allows numbers and commands to be input to a control unit 32. In response to the input numbers, and dictated by the input commands, an arithmetic unit 34 performs a desired operation to arrive at a numerical result. The numerical result is communicated to the user by a result indication means. As in an ordinary calculator, the result is visually indicated on the display 16. The result may also be indicated audibly, or tactiley. The mode selection key 26 allows selection between modes wherein the result is simply visually displayed, audibly indicated, tactiley indicated, and any combination thereof. The result repeat key 24 repeats the result when pressed by the user. This is especially important with the tactile and audible modes. It is taken for granted that on a normal visual display calculator, we can repeatedly look at the result. However, when the result is audibly or tactiley given, the calculator must actively repeat the result if the user so requires.

Audible indication is accomplished by sequentially communicating the numerals in the result to sample memory 36. An appropriate portion of sample memory 36 containing a digitized representation of the numeral is thereby addressed. That portion of the sample memory 36 is communicated to a digital to analog converter 38, which converts the digitized representation to an audio signal 39, which is amplified by an amplifier 40, and converted to sound by the speaker 18. The speaker 18 may be replaced by an earphone, for use in a quiet environment, or in a place where the speaker might disturb others. In addition to the result, audible feedback of each key 14 pressed may be provided by the same sample memory 36, digital to analog converter 38, amplifier 40 and speaker 18. The audible feedback of key presses is helpful for a person who is just beginning to learn Braille symbols, or is unsure if a key press was properly registered by the calculator.

Audible indication is often undesirable, because it would tend to disturb others in a workplace or classroom setting. Use of an earphone or headphones might provide a solution, but would tend to reduce the user's ability to hear surrounding sounds. A reduced ability to hear is especially undesirable in a classroom, where in addition to using the calculator, the user might have to listen for instructions. Tactile indication provides a solution in these situations, and allows the calculator to be used by persons having both hearing and sight impairments. Tactile indication is accomplished by a tactile result indicator 42. The tactile result indicator 42 produces a series of vibratory pulses which represent the numerical result. The tactile result indicator 42 is similar to a vibrator include in pagers.

Figure 3:
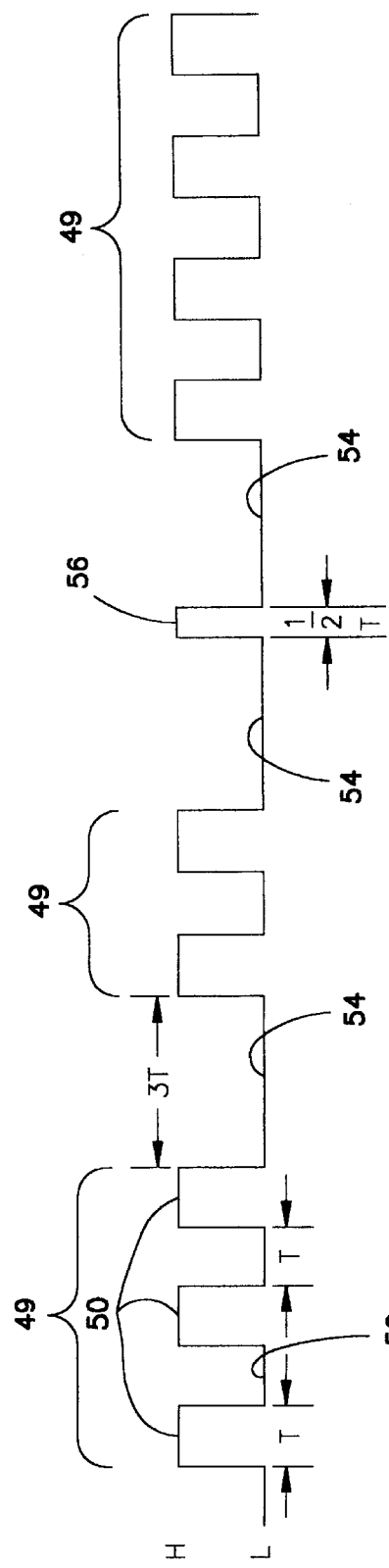
FIG. 3 is a timing diagram, illustrating a sample result indicated by the calculator according to an embodiment of the present invention.

FIG. 3 is a timing diagram illustrating a sample result being indicated by the tactile result indicator 42. A high or "H" state represents the presence of the vibratory pulse. A low "L" state represents the absence of the vibratory pulse.

Numerals 49 are serially communicated to the user. Each numeral is represented by a series of counting pulses 50. The length of each counting pulse is one time unit T. The number of counting pulses 50 used to represent the numeral is equal to its number (i.e. three counting pulses represent the numeral "3", four counting pulses represent the numeral "4", etc.). A zero can be indicated by ten pulses, or by two sequential numeral spaces without any counting pulses between the numeral spaces. If the zero is normally indicated by two sequential numeral spaces, other means such as ten counting pulses must be used when a zero falls at the end of the result. Each counting pulse 50 in a numeral is separated by a counting space 52, wherein there is an absence of vibration. The length of each counting space 52 is also one time unit T.

Two numerals 49 in the tactile indication of the result are temporally separated by a numeral space 54. A numeral space is a low state, wherein there is an absence of vibration. The numeral space 54 is preferably three time units 3T in length. Thus, the numeral space 54 is perceived as a "missing pulse" by the user.

A decimal point is indicated by a decimal pulse 56, which has a duration of one half time unit ½T. The decimal point is separated by the two adjoining digits by numeral spaces 54.

In analyzing the example depicted by the timing diagram of FIG. 3 from left to right, first, three counting pulses 50 are separated from each other by counting spaces 52, thus indicating the numeral "3". Then, after a numeral space 54, two counting pulses 50 indicate the numeral "2". Then, after a numeral space 54, a decimal pulse 56 having a short duration, indicates a decimal point to the user. Then, after a numeral space 54, a series of four counting pulses 50 indicates the numeral "4". Thus, in this example the result "32.4" has been communicated to the user.

Selection of the length of the time unit T is crucial to making the result intelligible, and reducing the time that it takes to communicate a multiple numeral result. However, this suitable time will vary from user to user. A beginner will desire longer pulses, until they become accustomed to tactiley discerning the output result. However, a person who works with the calculator daily will desire shorter pulses, to reduce the time that they spend waiting for the result. Therefore it is desirable to make the timing of the result indication adjustable. The speed that the result is indicated may be adjusted by the indicator speed adjustment 44, which provides a basic clock pace for the tactile result indicator 42, under control of the speed up and down keys 28. It allows the user to control the length of the time unit T, and thereby control the overall speed with which a result will be communicated.

In conclusion, herein is presented a calculator that may be used by persons having visual impairment, and both visual and auditory impairment. The calculator may be also used without disturbing others.

What is claimed is:

1. A calculator, comprising:
    a control unit;
    a keyboard for inputting numerals and functions to the control unit, having keys representing numerals and functions, each key has a tactile symbol being a Braille representation representing the numeral and function of the key;
    an arithmetic unit for performing numerical calculations and providing a result having at least one numeral to the control unit;
    a result indication means, for outputting the result in a manner selected from audibly and tactiley, comprising a tactile result indicator that communicates a result by producing counting pulses equal in number to the numeral being communicated.

2. The calculator as recited in claim 1, wherein counting pulses are separated by counting spaces, the counting pulses and counting spaces each last for a time unit.

3. The calculator as recited in claim 2, whereas in a result having at least two numerals, each numeral is separated by a numeral space.

4. The calculator as recited in claim 3, wherein a decimal point is indicated by a decimal pulse, the decimal pulse having a shorter duration than a counting pulse.

5. The calculator as recited in claim 4, wherein the decimal pulse is separated temporally from adjoining numerals by a numeral space.

6. The calculator as recited in claim 5, further comprising a indicator speed adjustment, for controlling the speed that a result is communicated to a user by the tactile result indicator by controlling the length of the time unit.

7. The calculator as recited in claim 6, wherein the indicator speed adjustment is controllable by the user.

8. The calculator as recited in claim 7, further comprising a device selected from a speaker and an earphone, for producing sound from the audio signal.

9. The calculator as recited in claim 1, wherein the result indication means further comprises:
    a display, for visually indicating the result;
    a sample memory that contains digitized representations of numerals; and
    a digital to analog converter for producing an audio signal from the digitized representations of the numerals.

10. The calculator as recited in claim 9, further comprising a mode selector, the mode selector allowing selection of visual result indication, audible result indication, and tactile indication.

11. The calculator as recited in claim 10, further comprising a result repeat key, which causes the calculator to audibly and tactiley repeat the result.

* * * * *